United States Patent [19]
Mineo

[11] Patent Number: 5,324,217
[45] Date of Patent: Jun. 28, 1994

[54] EXHAUST SYSTEM FOR SMALL BOAT
[75] Inventor: Shigeharu Mineo, Hamamatsu, Japan
[73] Assignee: Sanshin Kogyo Kabushuki Kaisha, Hamamatsu, Japan
[21] Appl. No.: 63,276
[22] Filed: May 18, 1993
[30] Foreign Application Priority Data
  Jul. 9, 1992 [JP] Japan .................... 4-206066
[51] Int. Cl.⁵ .............................. F01N 3/04
[52] U.S. Cl. ........................ 440/89; 440/88; 114/270; 60/310
[58] Field of Search .......... 440/88, 89; 60/310, 60/320, 321, 323; 181/220, 227, 228, 235
[56] References Cited
  U.S. PATENT DOCUMENTS
  4,811,560  3/1989  Nakase et al. ................ 440/89
  5,016,439  5/1991  Nitta ............................. 440/89
  5,096,446  3/1992  Tazaki et al. .................. 440/89
  5,212,949  5/1993  Shiozawa ...................... 440/89

FOREIGN PATENT DOCUMENTS
  2-148897  2/1990  Japan .

Primary Examiner—Edwin L. Swinehart
Attorney, Agent, or Firm—Knobbe, Martens, Olson & Bear

[57] ABSTRACT

An exhaust system for a small watercraft that includes a water trap device for precluding water entering the exhaust system if the watercraft becomes inverted from entering the engine through the exhaust system. Coolant from the engine is delivered to a cooling jacket that encircles the entire exhaust system and is introduced into the exhaust gases downstream of the water trap so that in the event of inversion and righting the engine coolant will also not enter the exhaust system. This also provides protection for catalyzers in the exhaust system.

15 Claims, 3 Drawing Sheets

EXHAUST SYSTEM FOR SMALL BOAT

BACKGROUND OF THE INVENTION

This invention relates to an exhaust system for a small boat and more particularly to an improved exhaust system for a small boat that will preclude water from re-entering the exhaust system in the vicinity of the exhaust ports in the event the boat is inverted and subsequently righted.

As is well known, many types of watercraft have their engines and exhaust systems disposed so that the exhaust gases are discharged to the atmosphere in close proximity to or even below the water level. In addition, it is also the practice to discharge the cooling water from the engine into at least a portion of the exhaust system so that it will be discharged back to the body of water in which the watercraft is operating along with the exhaust gases.

Many types of watercraft are quite sporting in their nature and it is anticipated that the watercraft may easily become capsized. These same watercraft are designed so that once capsized they will either be self-righting or can be easily righted. If the exhaust gases are discharged in close proximity to the water level, the inversion of the watercraft can cause water to enter the exhaust system through the exhaust outlet. When the watercraft is righted, this water may flow back through the exhaust system and enter the engine through its exhaust ports. Also, if the exhaust system includes a catalyzer, the catalyzer is normally positioned in close proximity to the exhaust ports and any water that may enter the exhaust system can seriously damage the catalyzer.

It has been proposed, therefore, to provide a device known as a water trap which is located in the exhaust system and which serves the purpose of trapping water in the event the watercraft is capsized and then righted so that the trapped water can again be returned to the body of water in which the watercraft is operating when the engine runs.

FIG. 1 shows a prior art construction of this type wherein an internal combustion engine of a known type is identified generally by the reference numeral 11 and has exhaust ports 12 that discharge the exhaust gases into a combined exhaust manifold and expansion chamber 13. An exhaust elbow, indicated generally by the reference numeral 14 has an internal passage 15 that communicates with the exhaust manifold 13 and delivers the exhaust gases to an expansion chamber 16 of a second expansion chamber device 17. The exhaust gases are discharged from the second expansion chamber device 16 through a further exhaust conduit 18 having a passage 19 which communicates with a water trap device, indicated generally by reference numeral 21.

The water trap device 21 is comprised of a box like configuration which is divided into an inlet chamber 22 and a discharge chamber 23 by an internal wall or baffle 24. The chambers 22 and 23 communicate with each other through a passage 25 in the wall 24. An inlet fitting 26 having a generally right angle configuration and facing downwardly receives the exhaust gases from the conduit 18 and they enter the chamber 22. These exhaust gases then flow through the opening 25 into the chamber 23 for discharge through an exhaust discharge conduit 27 which also has a right angle configuration and faces downwardly. A flexible exhaust conduit 28 connects the discharge 27 to the atmosphere in proximity to the water level.

With this type of device, if the watercraft in which the system described is inverted and the outlet end of the conduit 28 becomes submerged, water will flow into the water trap device 21. However, the device 21 has sufficient volume so that any water which fills it when inverted will not enter the opening of the exhaust inlet conduit 26. Hence, when the watercraft is righted, water will not flow back through the exhaust system described to the exhaust ports 12 of the engine.

In addition to the construction of the prior art as thus far described, it is also conventional in watercraft propulsion units of the type described to discharge the coolant from the cooling jacket of the engine 11 back to the body of water in which the watercraft is operating through the exhaust system. Frequently, certain components of the exhaust system and particularly those in close proximity to the engine, such as the exhaust manifold 13, exhaust elbow 14 and expansion chamber device 17 are provided with respective cooling jackets through which this coolant flows. These cooling jackets are indicated respectively at 29, 31 and 32. These cooling jackets are formed primarily by double wall construction. It should be seen that the expansion chamber device 16 has an outlet portion 33 which communicates with the exhaust conduit 18 and also the water from the cooling jacket 32 can enter the exhaust system at this point.

When the engine is running this type of system is quite effective. However, if the watercraft becomes inverted the engine will be stopped and this means that water from the cooling jackets can re-enter the exhaust conduits through the opening 33 and could enter the exhaust ports 12. In addition, if there is provided a catalyzer in the exhaust system, it will be positioned in this area since it is desirable to maintain it in close proximity to the engine exhaust ports and hence the catalyzer may be damaged.

It is, therefore, a principal object of this invention to provide an improved exhaust system for a small boat wherein it will be insured that water cannot enter the engine or impinge upon a catalyzer in the exhaust system in the event the watercraft is inverted and righted.

It is a further object of the invention to provide an arrangement wherein engine coolant is discharged into the exhaust gases but this engine coolant also is precluded from entering the exhaust system in the event the watercraft becomes inverted and re-righted.

It is a still further object of this invention to provide an improved exhaust system for a small watercraft wherein water entry to the engine or impingement on the catalyst bed is precluded.

SUMMARY OF THE INVENTION

This invention is adapted to be embodied in an exhaust system for a watercraft having a hull containing an internal combustion engine having an exhaust port. An exhaust conduit conveys exhaust gases from the exhaust port to a water trap device which is spaced from the engine. An exhaust discharge pipe extends from the water trap to the atmosphere for discharging exhaust gases to the atmosphere. The water trap device is configured to preclude water entering the exhaust discharge pipe from entering the exhaust port. A cooling jacket encircles at least a portion of the exhaust conduit and means deliver a liquid coolant to the cooling jacket. Means discharge coolant from the cooling jacket into the exhaust gases downstream of the water trap device.

DETAILED DESCRIPTION OF THE PREFERRED EMBODIMENT OF THE INVENTION

Figure 1:
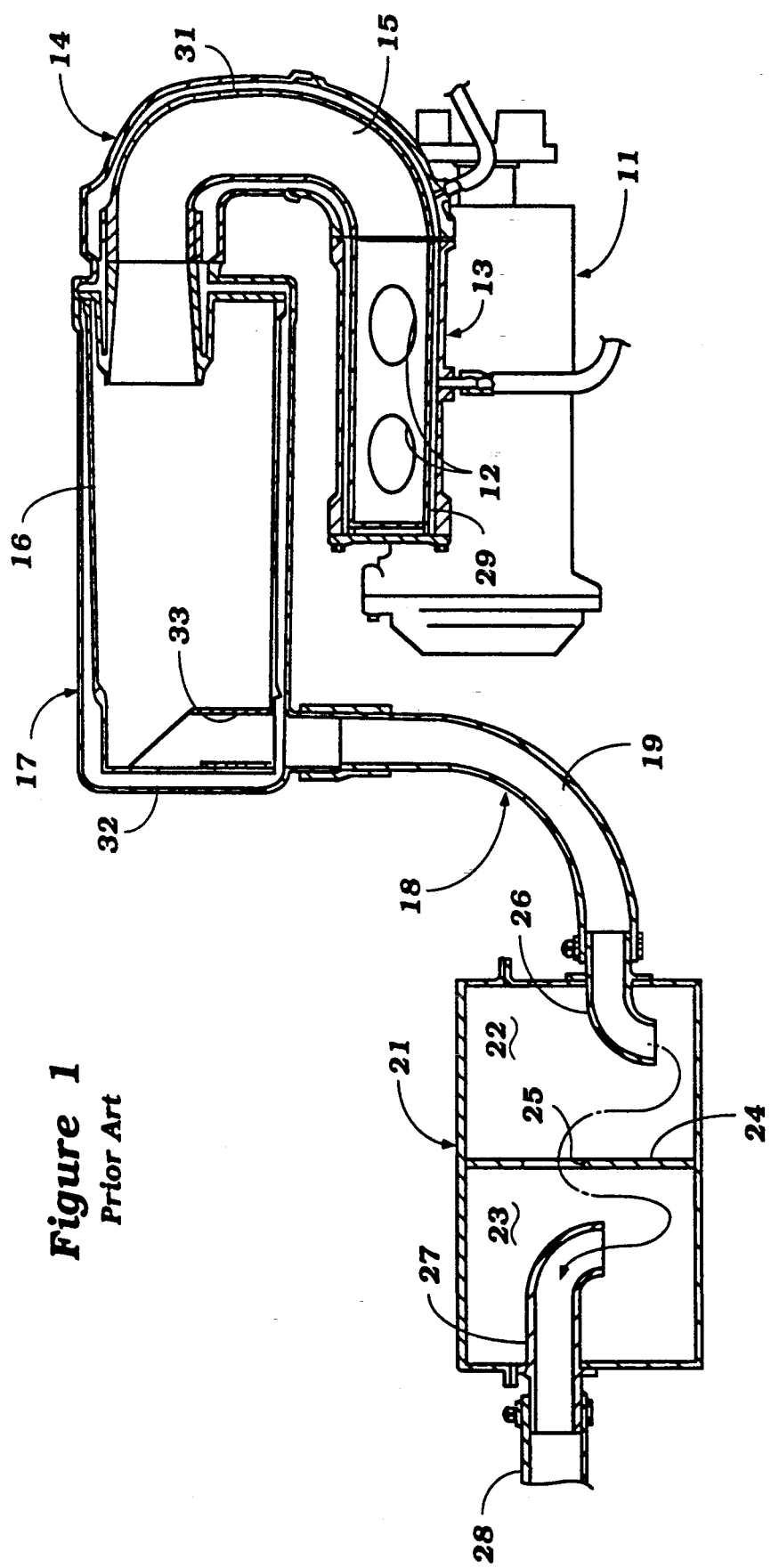
FIG. 1 is a partially schematic cross sectional view of the exhaust system of a prior art type of propulsion system for a small watercraft.
Figure 2:
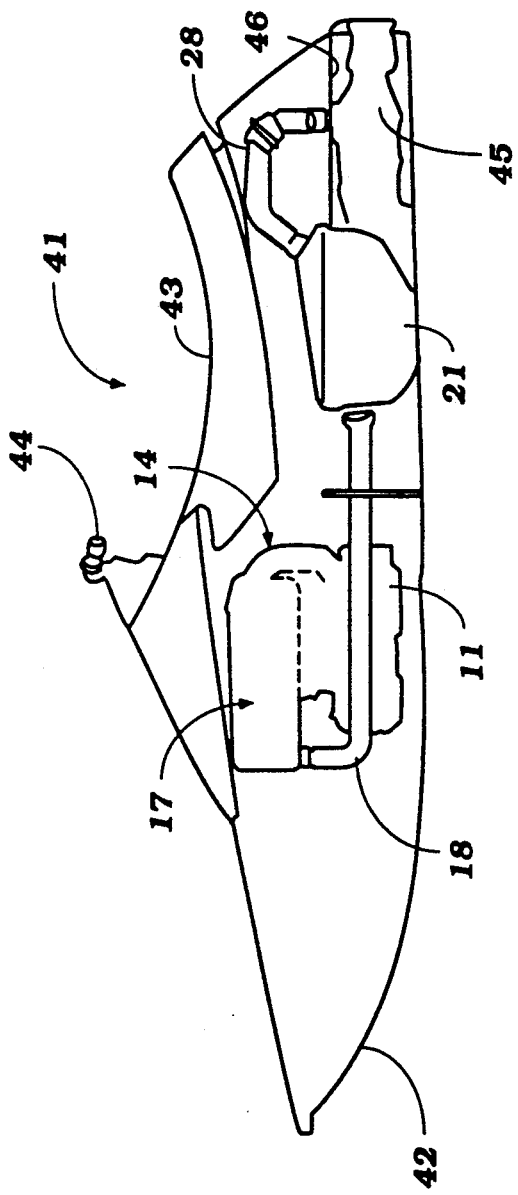
FIG. 2 is a side elevational view, with portions shown in section, of a small watercraft constructed in accordance with an embodiment of the invention.

Referring in detail to the drawings and initially to FIG. 2, a small watercraft of the type which can be employed to utilize the invention is identified generally by the reference numeral 41. The watercraft 41 is comprised of a hull 42 having a rearwardly positioned seat 43 that is adapted to accommodate one or more riders seated in straddle tandem fashion. A controlling handlebar assembly 44 is positioned forwardly of the seat 43 for steering of the watercraft and throttle control.

Forwardly of the seat 43 and beneath the handlebar control 44 there is provided an engine compartment in which an internal combustion engine is positioned. The engine and portions of its exhaust system are generally similar to the prior art type of constructions and for that reason, components of the engine and exhaust system, including the reference numeral 11 applied to the engine from the prior art construction already described will be applied in this figure. The engine 11 drives a jet propulsion unit, indicated generally by the reference numeral 45 which is positioned in a tunnel 46 at the rear of the hull for propelling the watercraft 41 in a well known manner. As has been previously noted, the watercraft is quite sporting in nature and is designed so that it may easily become inverted in operation but which will again right itself.

As with the prior art type of constructions, the engine 11 has an exhaust manifold which does not appear in FIG. 2 and which is connected to an exhaust expansion chamber device 17 by means of an elbow 14. The exhaust expansion chamber device 17 discharges the exhaust gases to the exhaust conduit 18 which, in turn, delivers them to the water trap device 21. The exhaust gases are then discharged back into the body of water in which the watercraft is operating by the exhaust conduit 28 which terminates in the tunnel 46 in an area in proximity to the water level but slightly above it.

Figure 3:
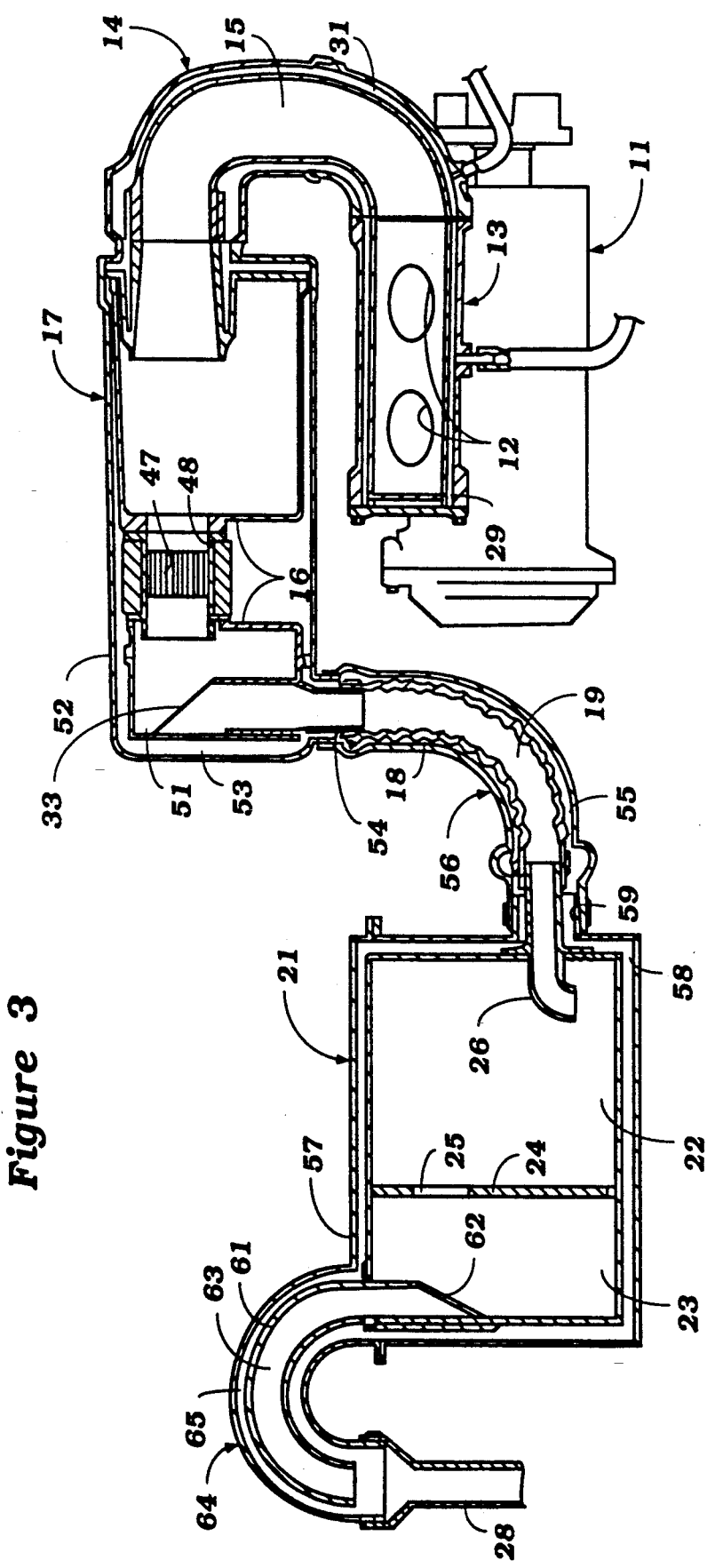
FIG. 3 is a partially schematic cross sectional view, in part similar to FIG. 1, showing the construction of the exhaust system of this embodiment.

The detailed construction of the exhaust system constructed in accordance with an embodiment of the invention will now be described by particular reference to FIG. 3 and, again, certain of the components which are the same or substantially the same as the prior art construction have been identified by the same reference numerals. Again, the engine 11 discharges the exhaust gases through its exhaust ports 12 into the exhaust manifold 13 which has a cooling jacket 29 which also receives coolant from the engine cooling jacket in any well known manner.

The exhaust gases from the exhaust manifold 13 are delivered to the exhaust elbow 14 and specifically an internal passageway 15 thereof. The cooling jacket 31 of the elbow 14 also receives coolant from the engine and this coolant may be delivered either directly from the manifold cooling jacket 29 or from an independent source in the engine.

In the embodiment of the invention described, the expansion chamber device 17 has a construction which is generally similar to that previously described but which differs from it in several regards in that it embodies a catalyst bed, indicated generally by the reference numeral 47 which catalyst bed is supported in a tube 48 that communicates a first expansion chamber 49 with a second expansion chamber 51 formed by the inner shell 16 of the expansion chamber device 17. An outer shell 52 encircles the inner shell 16 and defines a cooling jacket 53 therebetween which also receives engine coolant from the exhaust elbow cooling jacket 31. The catalyst bed 48 will treat the exhaust gases and insure that any harmful constituents therein will be readily treated.

The discharge passageway 33 from the expansion chamber device 17 is formed in the expansion chamber portion 51 and extends downwardly through the outer shell 52 in a manner similarly previously disclosed. However, in this embodiment, the exhaust conduit 18 is connected directly to an extending nipple 54 of the exhaust outlet 33 and hence the exhaust passageway 19 communicates directly with the expansion chamber portion 51.

Coolant from the cooling jacket 53 of the expansion chamber device 17 is not introduced to the exhaust gases at this point but rather is introduced into a further cooling jacket 55 which is formed by a flexible conduit 56 that encircles the exhaust conduit 18. Hence, the engine coolant is not reintroduced into the exhaust system at the expansion chamber device 17 as with the previously described prior art constructions but rather is conveyed through the cooling jacket 55 for introduction to the exhaust gases at a downstream location so as to prevent any re-entry of the coolant to the exhaust system and impingement on the catalyst bed 47.

The manner in which this is done will now be described.

The water trap device 21 of this embodiment has an internal shell which provides the two compartments 22 and 23 with the dividing wall 24 with the opening 25 therein. However, there is further provided an outer shell 57 which defines a further cooling jacket 58 around the water trap device 21. The coolant from the conduit cooling jacket 55 is discharged into an inlet opening 59 for this cooling jacket 58 which encircles the exhaust inlet pipe 26.

In addition, the exhaust outlet pipe of this embodiment has a U shaped configuration, as seen at 61 with a downwardly facing opening 62 that opens into the chamber 23. This exhaust outlet pipe 61 has its U shaped passage 63 encircled by a further like shaped tubular member 64 which defines a further cooling jacket 65 around the outlet pipe 63. This jacket 65 forms the outlet from the water trap cooling jacket 55 and it is at this point when the coolant is again mixed with the exhaust gases in the conduit 28 which extends to the tunnel area 46 as previously described.

Hence, because the coolant from the entire exhaust system cooling jackets and from the engine cooling jacket is introduced into the exhaust gases downstream of the water trap device 21, even if the watercraft becomes inverted and the engine stops any coolant from the engine cooling jacket will not pass back into the exhaust system. The trap shape of the conduit 61 further insures against this. Hence, not only the engine is protected from coolant entering it through the exhaust ports 12 but the catalyzer bed 47 will be well protected from this water and cannot be damaged.

Of course, it is to be understood that the foregoing description is that of a preferred embodiment of the invention and that various changes and modifications may be made without departing from the spirit and scope of the invention, as defined by the appended claims.

I claim:

1. An exhaust system for a watercraft having a hull containing an internal combustion engine having an exhaust port, an exhaust conduit for conveying exhaust gases from said exhaust port, a water trap device supported in said hull at a position spaced from said engine and to which exhaust gases are delivered by said exhaust conduit, an exhaust discharge pipe extending from said water trap device to the atmosphere for discharging exhaust gases thereto, said water trap device including an internal volume being configured to preclude water entering said exhaust discharge pipe from entering said exhaust port, a cooling jacket encircling at least a portion of said exhaust conduit, means for delivering liquid coolant to said cooling jacket, and means for discharging coolant from said cooling jacket into the exhaust gases downstream of said water trap and at a point above the internal volume of said water trap.

2. An exhaust system for a watercraft as set forth in claim 1 further including a catalyzer positioned in the exhaust conduit.

3. An exhaust system for a watercraft as set forth in claim 2 wherein the catalyzer is encircled by at least a portion of the cooling jacket.

4. An exhaust system for a watercraft as set forth in claim 1 wherein there is provided a second cooling jacket around the water trap and means for conveying coolant from the cooling jacket encircling a portion of the exhaust conduit to said second cooling jacket and wherein the coolant is discharged from the second cooling jacket into the exhaust gases downstream of the water trap.

5. An exhaust system for a watercraft as set forth in claim 4 wherein the exhaust discharge pipe from the water trap has a generally inverted U shaped configuration and the coolant is delivered to the downstream end of said U shaped section.

6. An exhaust system for a watercraft as set forth in claim 5 further including a catalyzer positioned in the exhaust conduit.

7. An exhaust system for a watercraft as set forth in claim 6 wherein the catalyzer is encircled by at least a portion of the cooling jacket.

8. An exhaust system for a watercraft as set forth in claim 1 wherein the entire exhaust conduit is encircled by a cooling jacket.

9. An exhaust system for a watercraft as set forth in claim 8 wherein the exhaust conduit includes at least one expansion chamber also encircled by the cooling jacket.

10. An exhaust system for a watercraft as set forth in claim 9 wherein there is provided a second cooling jacket around the water trap and means for conveying coolant from the cooling jacket encircling a portion of the exhaust conduit to said second cooling jacket and wherein the coolant is discharged from the second cooling jacket into the exhaust gases downstream of the water trap.

11. An exhaust system for a watercraft as set forth in claim 10 further including a catalyzer positioned in the exhaust conduit.

12. An exhaust system for a watercraft as set forth in claim 11 wherein the catalyzer is encircled by at least a portion of the cooling jacket.

13. An exhaust system for a watercraft having a hull containing an internal combustion engine having an exhaust port, an exhaust conduit for conveying exhaust gases from said exhaust port, a water trap device spaced from said engine into which exhaust gases are delivered by said exhaust conduit, an exhaust discharge pipe extending from said water trap device to the atmosphere for discharging exhaust gases thereto, said water trap device being configured to preclude water entering said exhaust discharge pipe from entering said exhaust port, a cooling jacket encircling at least a portion of said exhaust conduit, means for delivering liquid coolant to said cooling jacket, said exhaust discharge pipe having a generally inverted U-shaped configuration, and means for discharging coolant from said cooling jacket into the downstream end of said U-shaped section of said exhaust discharge pipe.

14. The exhaust system for a watercraft of claim 13 having a hull, further including a catalyzer positioned in the exhaust conduit.

15. The exhaust system for a watercraft of claim 13 having a hull, wherein the catalyzer is encircled by at least a portion of the cooling jacket.

* * * * *